(12) United States Patent
Kenney et al.

(10) Patent No.: US 8,396,150 B2
(45) Date of Patent: *Mar. 12, 2013

(54) TONE COUNT SELECTION

(75) Inventors: Thomas J. Kenney, Portland, OR (US);
Eldad Perahia, Portland, OR (US);
Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/655,051

(22) Filed: Dec. 22, 2009

(65) Prior Publication Data

US 2011/0150110 A1 Jun. 23, 2011

(51) Int. Cl.
H04L 27/28 (2006.01)
(52) U.S. Cl. ......... 375/261; 375/260; 375/298; 375/316
(58) Field of Classification Search .......... 375/260, 375/261, 295, 298, 316
See application file for complete search history.

(56) References Cited

U.S. PATENT DOCUMENTS

| 7,170,849 | B1 | 1/2007 | Arivoli et al. | |
|---|---|---|---|---|
| 2007/0153833 | A1* | 7/2007 | Chang et al. | 370/477 |
| 2007/0230594 | A1 | 10/2007 | Mo et al. | |
| 2008/0298510 | A1 | 12/2008 | Jonsson | |
| 2009/0304097 | A1 | 12/2009 | Han et al. | |
| 2011/0026623 | A1* | 2/2011 | Srinivasa et al. | 375/260 |

FOREIGN PATENT DOCUMENTS

| WO | 2008093945 A2 | 8/2008 |
|---|---|---|
| WO | 2011/087559 A2 | 7/2011 |
| WO | 2011/087559 A3 | 9/2011 |

OTHER PUBLICATIONS

International Search Report and Written Opinion Received for PCT Application No. PCT/US2010/056202 mailed on Jul. 28, 2011, 9 pages.
Office Action received for U.S. Appl. No. 13/136,523, mailed on May 22, 2012, 15 pages.
Ramadurai et al., "Software Implementation of 802.11a Blocks on Sandblaster DSP", Proceedings of Software Defined Radio Technical Forum (SDR Forum '06), Orlando Florida, Nov. 2006, 5 pages.
International Preliminary Report on Patentability and Written Opinion received for PCT Patent Application No. PCT/US2010/056202, mailed on Jul. 5, 2012, 6 pages.

* cited by examiner

Primary Examiner — Shuwang Liu
Assistant Examiner — David Huang
(74) Attorney, Agent, or Firm — Forefront IP Lawgroup, PLLC

(57) ABSTRACT

A tone selection module selects tones suitable for use in an orthogonal frequency division multiplexing (OFDM) data transmission device based on several constraints. These constraints include number of available tones, modulation type, and code rate. The OFDM device may use either wired or wireless transmission.

14 Claims, 5 Drawing Sheets

```
function [Ncbps, Ndbps, cnt] = FindCombinations()

% Possible configurations
FFTsize = 256;

% Variables
% Modtype is modulation order 1= bsps, 2=qpsk, 4=16QAM, 6= 64 QAM, 8 = 256QAM
and 10= 1024
Modtype = [1 2 4 6 8 10]; % bpsk, qpsk, 16, 64,256 and 1024 QAM % r = code rate;
r = [.5 0 0 ;.5 3/4 0; .5 3/4 0; 2/3 3/4 5/6];
ModRateIndex = [1 2 2 3];

% Nsd = number of data tones.
% Nbpscs = number of bits per spatial carrier for stream i for( Nsd = 216:248 ) % loop to sweep the number of Data tones (216:248)
    for( k=1:12 )% loop to sweep Ncol for the Interleaver (1:12)
        for( RowCnt = 6:12 ) % loop to sweep Nrow for the Interleaver (6-12)
            cnt = [0 0 0 0 0];
            hit = 1;
            for( ModCnt = 1:4)
                Ncbps = Nsd * Modtype(ModCnt); % 1 stream
                Ndbps = r(ModCnt,ModRateIndex)' * Ncbps;
                Nbpscs = Ncbps/Nsd;
                for( RateCnt = 1:ModRateIndex(ModCnt) )
                    tmp = [k RowCnt RateCnt, Nsd, Nbpscs];
                    cnt = [cnt; tmp];
                    INTdim = (RowCnt*Nbpscs) * (18+k);
                    Metric = Ncbps/INTdim;
                    Metric-floor(Metric);
                    if( Metric - floor(Metric) )
                        cnt = [0 0 0 0 0];
                        hit = 0;
                        break
                    elseif( Ndbps(RateCnt)-floor(Ndbps(RateCnt)) )
                        cnt = [0 0 0 0 0];
                        hit = 0;
                        break
                    end
                end
            end
            if( hit )
% fprintf('\n Row = %d, Col = %d, Nsd = %d, NTonesLeft = %d\n', ...
% cnt(end,2), cnt(end,1)+18, Nsd, FFTsize-Nsd);
                fprintf('\n %4d %4d %4d',cnt(end,2),cnt(end,1)+18);
            end
        end
    end
end
if( ~hit )
    disp(' No combination found using the following rates and modulations')
end
```

Fig. 3

| $N_{SD}$ | Pilot, DC, Guard Tones (256-SD) | $y$ | $N_{COL}$ |
|---|---|---|---|
| 216 | 40 | 9 | 24 |
| 216 | 40 | 8 | 27 |
| 220 | 36 | 11 | 20 |
| 220 | 36 | 10 | 22 |
| 224 | 32 | 8 | 28 |
| 228 | 28 | 6 | 19 |
| 228 | 28 | 12 | 12 |
| 230 | 26 | 10 | 23 |
| 232 | 24 | 8 | 29 |
| 234 | 22 | 9 | 26 |
| 240 | 16 | 6 | 20 |
| 240 | 16 | 8 | 30 |
| 242 | 14 | 11 | 22 |

| Modulation | Code Rate | $N_{SD}$ | Pilot, DC, Guard (256-Nsd) | $y$ | $N_{COL}$ |
|---|---|---|---|---|---|
| 256-QAM | 3/4 | 232 | 24 | 8 | 29 |
|  |  | 234 | 22 | 9 | 26 |
| 256-QAM | 5/6 | 234 | 22 | 9 | 26 |
| 256-QAM | 7/8 | 232 | 24 | 8 | 29 |
|  |  | 234 | 22 | 9 | 26 |
| 1024-QAM | 3/4 | 232 | 24 | 8 | 29 |
|  |  | 234 | 22 | 9 | 26 |
| 1024-QAM | 5/6 | 234 | 22 | 9 | 26 |
| 1024-QAM | 7/8 | 232 | 24 | 8 | 29 |
|  |  | 234 | 22 | 9 | 26 |

TONE COUNT SELECTION

BACKGROUND

Orthogonal frequency division multiplexing (OFDM) provides a useful way to modulate data for transmission. OFDM may be considered a form of digital multi-carrier modulation. A large number of orthogonal sub-carriers are used to carry data. Data for transmission is then divided into several parallel data streams for transmission. Each of the sub-carriers may in turn be modulated using binary phase-shift keying (BPSK), quadrature phase-shift keying (QPSK), quadrature amplitude modulation (QAM), and so forth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols to during transmission to avoid inter-symbol interference (ISI), such as might result from multi-path distortion. These guard tones also help the signal conform to a spectral mask. The nulling of the direct component (DC) may be used to simplify direct conversion receiver designs.

Selecting tone for use within a given OFDM system has proven problematic, particularly when constraints such as reuse of existing OFDM components are included.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

FIG. 3 is an example script for selecting tones for use by an OFDM module.

DETAILED DESCRIPTION

Overview

OFDM is used for modulating communications both for wired and wireless devices. As described above, an OFDM system uses selected tones for operation. These tones may be used for data, pilot, guard, DC, and other functions.

Demands for higher capacity communications may result in modifications to OFDM systems to increase capacity. It is beneficial for these modifications to make use of existing code and hardware where possible. For example, in a wireless OFDM system a deployed interleaver/deinterleaver may be re-used in an OFDM system using larger bandwidth with minimal modification. This re-use minimizes development costs and risk associated with new technologies.

Disclosed in this application is a system and techniques suitable for selecting tones for use by an OFDM system, such that existing OFDM components may be leveraged and re-used with minimal or no changes. In one example, a wireless communication system using OFDM with a 40 MHz channel bandwidth may be extended to 80 MHz, increasing the data transmission capacity of the system.

Illustrative Architecture

Figure 1:
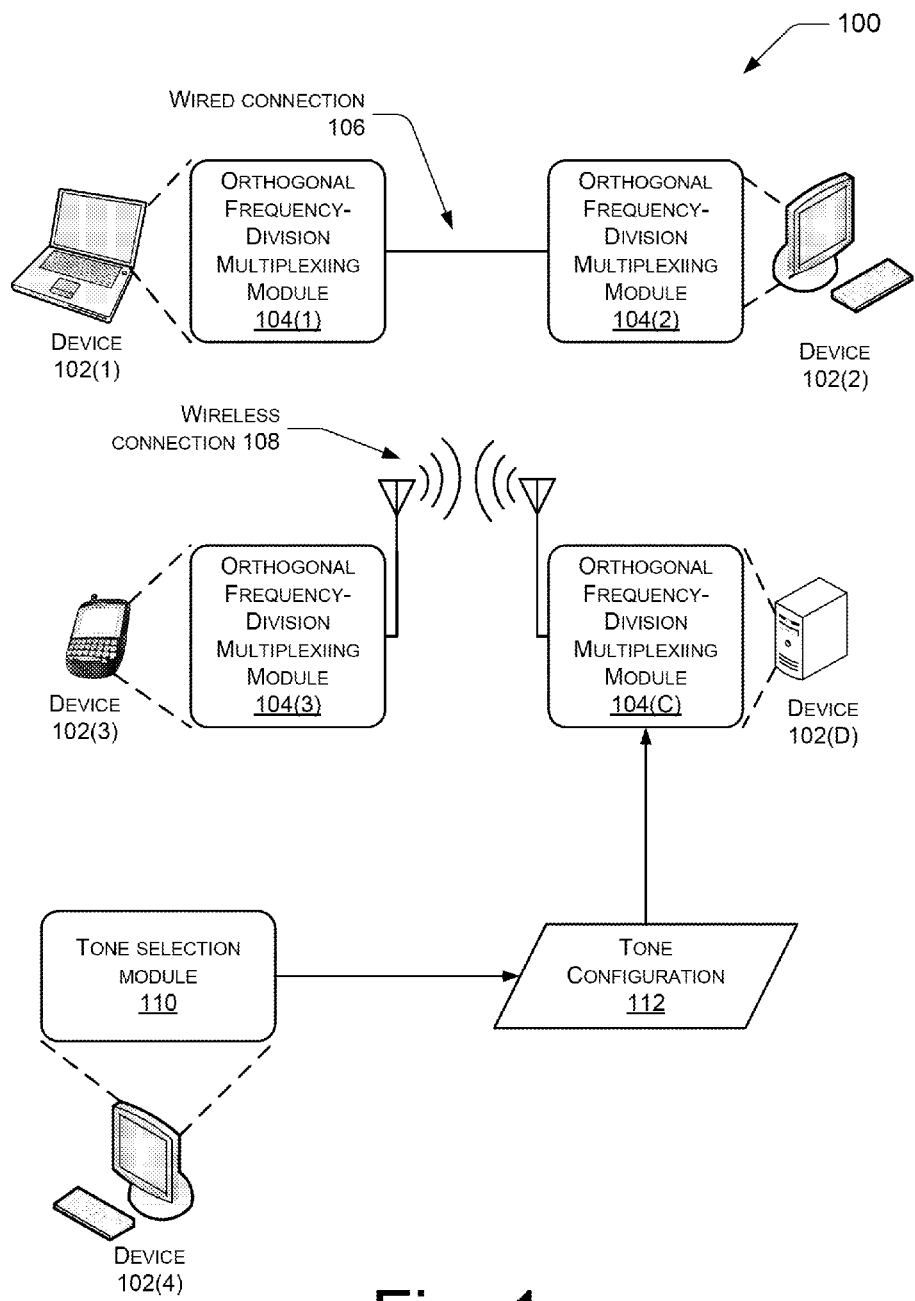
FIG. 1 is an illustrative architecture of a tone selection module and OFDM modules using selected tones.

FIG. 1 is an illustrative architecture 100 of a tone selection module and OFDM modules using the selected tones. A device 102(1) is shown with an orthogonal frequency division multiplexing (OFDM) module 104(1) which is coupled via a wired connection 106 to an OFDM module 104(2) in a device 102(2). OFDM module 104 is configured to generate an OFDM signal. Also shown is a wireless device 102(3) having an OFDM module 104(3) which is wirelessly coupled to OFDM module 104(C) in device 102(D). Each device 102 (1)-(D) includes a transmitter, receiver, or transceiver to convey output from one OFDM 104 module to another OFDM module 104. These transmitters, receivers, or transceivers may be configured to convey the output via an electrical conductor, electromagnetic radiation, or both. Each device 102(1)-(D) includes one or more processors (not shown) and a memory (not shown) coupled to the processor. This processor may be configured to execute instructions stored in the memory.

Devices 102(1)-(D) may include wireless access points, radio frequency transceivers, software defined radios, modems, interface cards, cellular telephones, portable media players, desktop computers, laptops, tablet computers, netbooks, personal digital assistants, servers, standalone transceiver interfaces, and so forth.

A tone selection module 110 may be present within device 102(4). Tone selection module 110 generates and may output one or more OFDM tone configurations 112. These tone configurations 112 meet one or more pre-determined constraints. In one implementation, constraints may include ability to re-use an existing interleaver/deinterleaver, specific modulation such as 256-QAM, and so forth. The process utilized by the tone selection module 110 is discussed in more detail below with regards to FIGS. 2 and 3.

Tone configuration 112 may then be implemented within OFDM modules 104(1)-(C) for use in transferring information between two or more devices 102(1)-(D). As described above, the tones in the tone configuration 112 may be selected to facilitate re-use of existing components such as the interleaver/deinterleaver.

Figure 2:
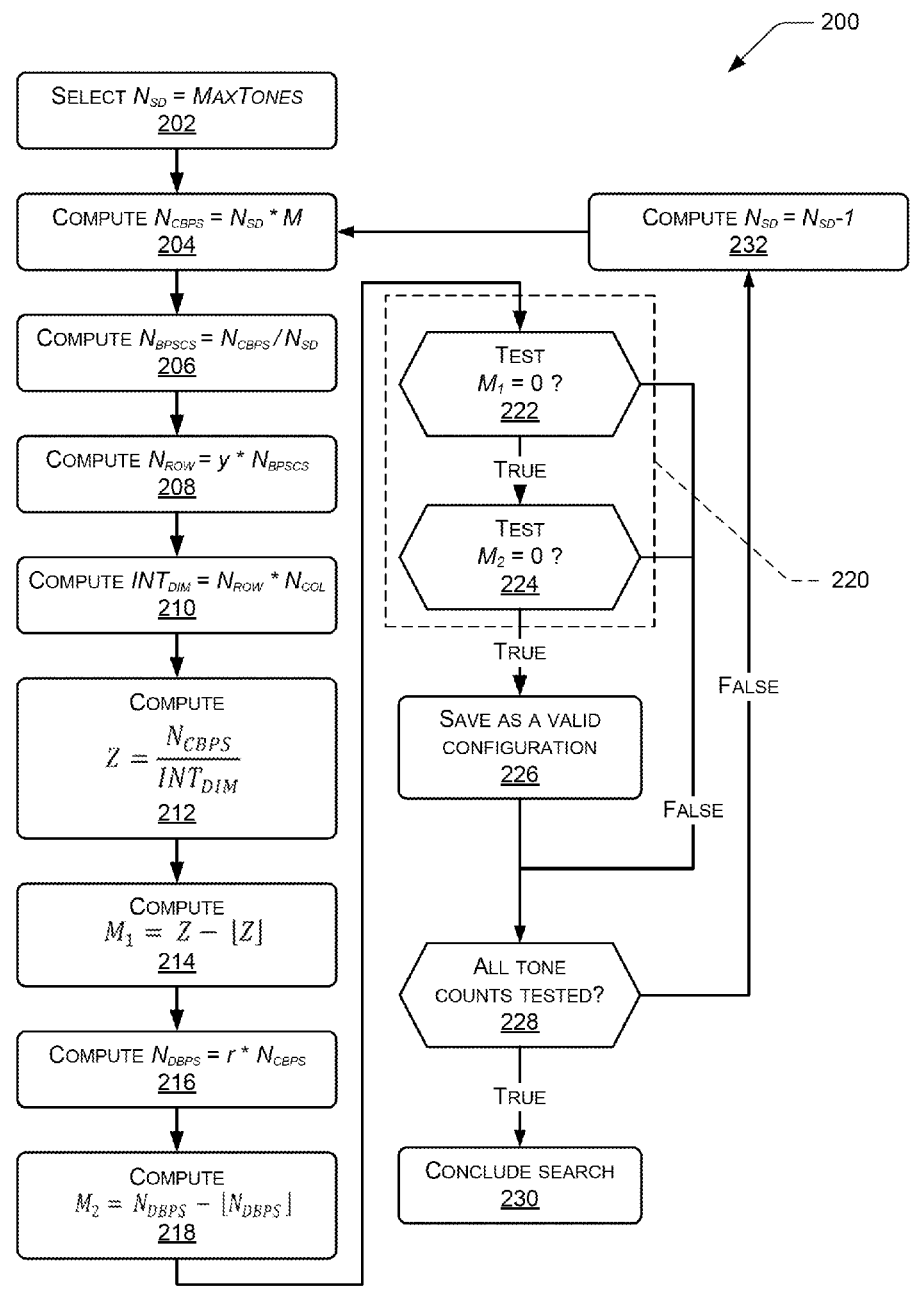
FIG. 2 is a flow chart of a process for selecting tones for use by an OFDM module.

FIG. 2 is a flow chart for an example process 200 for selecting tones with a tone selection module 110. Selected tones may be used by an OFDM module 104. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 202, the tone selection module 110 accepts a selection of a number of data subcarriers $N_{SD}$ to test. $N_{SD}$ may be selected to maintain compatibility with an existing OFDM system. For example, an OFDM system with a 40 MHz channel bandwidth may be modified to 80 MHz channel bandwidth to increase data capacity. For the following examples, assume at least 1 tone is assigned to DC, at least 7 tones will be utilized for guard, and the 40 MHz system uses 108 data tones. Doubling the channel bandwidth from 40 MHz to 80 MHz would double the number of data tones, thus $N_{SD}=2*108=216$ data tones.

At block 204, a number of coded bits per symbol $N_{CBPS}=N_{SD}*M$ is computed where M comprises a modulation order. This modulation order may be used to represent characteristics of the subcarrier modulation. In one implementation, the modulation order may comprise one of the following integer values:

1 for a binary phase-shift keying (BPSK) modulation;

2 for a quadrature phase-shift keying (QPSK) modulation;

4 for quadrature amplitude modulation (QAM) with 16 states (16-QAM);

6 for QAM with 64 states (64-QAM);

8 for QAM with 256 states (256-QAM); or 10 for QAM with 1024 states (1024-QAM).

Continuing the example above, assume BPSK will be assessed initially. Thus, $N_{CBPS}=N_{SD}*M=216*1=216$ coded bits per symbol. At block 206, a number of coded bits per single carrier $N_{BPSCS}=N_{CBPS}/N_{SD}$ is calculated. Continuing the example from above, $N_{BPSCS}=216/216=1$. At block 208, $N_{ROW}=y*N_{BPSCS}$ is computed, where y is an assigned interleaver parameter. Thus, the number of rows in an OFDM interleaver are $y*N_{BPSCS}$. As shown below with regards to table 20-16, in some OFDM systems where y=4, $N_{ROW}=4*N_{BPSCS}$, while in other systems where y=6, $N_{ROW}=6*N_{BPSCS}$, and so forth. Given a specified $N_{ROW}$ and $N_{BPSCS}$, y may be determined.

In an OFDM module 104, an interleaver intersperses constituents of two or more codewords together before transmission on a channel. A deinterleaver reverses this process. In some implementations a modified version of an interleaver used in Institute of Electrical and Electronics Engineers (IEEE) 802.11-compliant OFDM systems may be used. This channel interleaver is defined in section 20.3.11.7.3 of the IEEE P802.11n/D6.0, "Draft Standard for Information Technology-Telecommunications and information exchange between systems—Local and metropolitan area networks—Part 11: Wireless LAN Medium Access Control (MAC) and Physical Layer (PHY) specifications." From this text, interleaver parameters from Table 20-16 "Number of Rows and columns in the interleaver" are shown below.

TABLE 20-16

| Bandwidth | 20 MHz | 40 MHz |
|---|---|---|
| $N_{COL}$ | 13 | 18 |
| $N_{ROW}$ | $4 * N_{BPSCS}$ | $6 * N_{BPSCS}$ |
| $N_{ROT}$ | 11 | 29 |

These parameters define the number of coded symbols stored in the interleaver. Continuing the example above for expanding from a 40 MHz channel bandwidth to 80 MHz channel bandwidth, the existing interleaver and associated algorithms may be reused. Such reuse calls for modification of the interleaver to accommodate a matrix defined to write and read data in the OFDM system with the greater channel bandwidth. These parameters include $N_{ROW}$ and $N_{COL}$ which define the number of coded symbols stored in the interleaver. Thus, continuing the example, $N_{ROW}=9*1=9$. In accommodating the larger matrix, $N_{ROT}$ is used to define a rotation of values when more than one spatial stream exists. $N_{ROT}$ may be ignored because it does not define the interleaver size and thus does not affect tone selection.

At block 210, $INT_{DIM}=N_{ROW}*N_{COL}$ is computed. In this example, assuming $N_{COL}=24$ (as shown below with regards to FIG. 4) then $INT_{DIM}=9*24=216$. At block 212, $$Z = \frac{N_{CBPS}}{INT_{DIM}}$$

is computed. In this example, Z=216/216=1.

At block 214, $M_1=Z-\lfloor Z \rfloor$ is computed. Continuing the example, Z=1−1=0. At block 216, a number of data bits per symbol $N_{DBPS}=r*N_{CBPS}$, where r is a code rate, is computed. Code rate indicates the portion of non-redundant information present when data is encoded. For this example, assume a code rate of ½, indicating that half of the data actually transmitted is non-redundant, while the other half is redundant such as may be included due to error correction protocols. Thus, $N_{DBPS}=½*216=153$. At block 218, $M_2=N_{DBPS}-\lfloor N_{DBPS} \rfloor$. In this example, $M_2=153-\lfloor 153 \rfloor=0$.

Certain tone selections may fail to work properly with certain modulation techniques. Thus, it may be useful to test configurations to confirm a particular combination of code rate and modulation is valid. A particular combination may be considered valid when that combination will function using an existing or minimally extended OFDM component, such as an interleaver. In other words, will a particular combination of code rate and modulation work with a given tone selection? For example, in some OFDM systems, non-integer numbers of bits cannot be processed due to the mapping done in encoding, modulation. It is possible with certain selections of coding, modulation and tone selection that the test at block 214 passes, but the result is a non-integer number for $N_{DBPS}$ results. An information bit must be a full bit, as OFDM cannot encode information in a partial bit. In some implementations, bit padding may be used to take non-integer numbers of bits and add additional bits to produce an output with an integer number of bits.

When bit padding is not in use, the constraints as shown within the dotted line at 220 may be used to limit output of tone selections to those which have integer numbers of bits. This may also limit code rates which are available. For example, using 256-QAM, code rates of ⅔ and ⅚ may not be available without extensive modification to existing OFDM systems. Such modification may render the resulting OFDM system incompatible with prior OFDM systems.

At block 222, a test is performed to determine if $M_1=0$. When this test is true, block 224 tests to determine if $M_2=0$. As mentioned above, in some implementations where bit padding is available, or these constraints shown within 220 otherwise do not apply, they may be omitted. Continuing the above example, $M_1=0$ and $M_2=0$, therefore the configuration is valid. When block 222 or 224 result in a false output, the process may continue to block 228 below to determine if all tone counts have been tested.

At block 226, a resulting tone selection may be saved as a valid configuration. The previous acts may be looped until all available tone counts are tested. At block 228, when all tone counts have been tested, the process then proceeds to block 230 and the search concludes. Results from this process may then be stored to computer-readable storage media, presented to a user, and so forth.

When block 228 determines tone counts remain to be tested, at block 232 $N_{SD}=N_{SD}-1$ is computed. The results may be returned to block 204 for the process to continue until all tone counts have been tested.

FIG. 3 is an example script for selecting tones for use by the OFDM module 104. This script is written for use with the MATLAB simulation tool for one implementation of a tone count selection module 110. MATLAB is a product of The MathWorks Inc. of Natick, Mass. This script is provided as an example, not as a limitation.

Within this script, the process iterates over a set of possible data tones in the range of 216 to 248. The 216 value was chosen as described above. Legacy OFDM systems used a total of 64 tones in conjunction with a 20 MHz channel bandwidth, and 128 tones in conjunction with a 40 MHz channel bandwidth. In order to reuse the same tone spacing of the legacy systems and thus maximize reuse of hardware and software, an 80 MHz channel bandwidth system would use 256 tones. Given this constraint of 256 tones, 248 is chosen because with 256 tones total, only 8 tones would be available for other uses including pilot, guard, and DC. Given that 8 tones may be impractically limiting for an OFDM system, 248 was selected in this example as an upper bound.

Next, an inner loop iterates over the $N_{COL}$ interleaver dimension. In this example, this loop iterates from 1 to 12, which maps a column size of 18 to 30 in an interleaver. In a wireless protocol defined by specification IEEE 802.11, the column size was 13 for 20 MHz bandwidth and 18 for 40 MHz bandwidth, thus a range of 18 to 30 is appropriate for an OFDM system having an 80 MHz bandwidth.

The next inner loop is for the $N_{ROW}$ count, which is allowed to run from 6 to 12 in this example. In the wireless protocol defined by specification IEEE 802.11, the row multiplier is 4 for 20 MHz, 6 for 40 MHz, thus a range of 6 to 12 is appropriate for 80 MHz. The next two inner loops are for the modulation and code rate. The code rate may be selected based on the modulation type.

Figure 4:
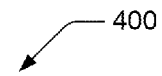
FIG. 4 is a table of illustrative possible configurations for an OFDM system having an 80 MHz bandwidth.

FIG. 4 is a table of illustrative possible configurations 400 generated using the script of FIG. 3 for an OFDM system having an 80 MHz bandwidth. In some implementations, these tone configurations 112 may be applied to a wireless networking protocol using OFDM, including but not limited to those related to the IEEE 802.11 standard. In generating this table of configurations 400 the following assumptions were made of an 80 MHz bandwidth OFDM system having tone spacing, modulation, and coding rates present in existing systems. These constraints are included to maximize reuse of software and hardware designs, and may also provide an avenue for backward compatibility.

Based on this configuration and assuming no changes in the 80 MHz system for coding or modulation, several configurations shown at 400 are possible. In one implementation, the same tone assignment for the guard tones, pilot tones, and DC as in a 40 MHz system may be used. For example, in the 40 MHz system there are 11 guard, 6 pilot, and 3 DC tones, for a total of 20 tones. Therefore, data tone assignments larger than 256−20=236 are not available.

In another implementation, a 234 data tone configuration may be suitable. This configuration allows an additional 2 tones to be allocated to pilot, guard, or other use. In another implementation, 232 tones may be allocated, which would provide 4 additional tones for pilot or guard functions.

Figure 5:
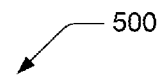
FIG. 5 is a table of possible allocations for new modulation and coding types, based on a portion of the possible configurations of FIG. 4.

FIG. 5 is a table 500 of possible tone configurations based on a portion of the possible configurations of FIG. 3. In a wireless networking system, additional code rates and modulation types may be included to increase peak data rates. In the table 500, a 256 state QAM modulation and a 1024 state QAM as well as a code rate of r=⅞ have been introduced.

Given the 256-QAM and 1024-QAM and a code rate r=⅞, the process of FIG. 2 as implemented by the script of FIG. 3 may be used to determine possible tone configurations 112. The configurations of the table 500 are focused on tone counts under the 236 tone count arrived above, and above a tone count of 230. When $N_{SD}$=234 all code rates ¾, ⅚, and ⅞ are available, providing flexibility in selection. In comparison, when $N_{SD}$=232 only the ¾ and ⅞ code rates are supported.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic disk storage or other magnetic storage devices, or any other medium which can be used to store the desired information and which can be accessed by a computing device.

What is claimed is:

1. A device for selecting tones for orthogonal frequency division multiplexing, the device comprising:
   a processor;
   a memory coupled to the processor;
   a tone selection module stored in the memory and configured to execute on the processor to:
   select a number of data subcarriers $N_{SD}$ to test;
   compute a number of coded bits per symbol $N_{CBPS}=N_{SD}*M$ where M comprises a modulation order;
   compute a number of coded bits per single carrier $N_{BPSCS}=N_{CBPS}/N_{SD}$;
   compute $N_{ROW}=y*N_{BPSCS}$, where y is an assigned interleaver parameter;
   compute $INT_{DIM}=N_{ROW}*N_{COL}$ where $N_{ROW}$ is a number of rows in an interleaver and $N_{COL}$ is a number of columns in the interleaver;
   compute $$Z = \frac{N_{CBPS}}{INT_{DIM}};$$

compute $M_1=Z-\lfloor Z \rfloor$; and
   compute a number of data bits per symbol $N_{DBPS}=r*N_{CBPS}$, where r is a code rate;
   compute $M_2=N_{DBPS}-\lfloor N_{DBPS} \rfloor$.

2. The device of claim 1, the tone selection module being further configured to determine that a tone selection is valid when $M_1=0$ and $M_2=0$.

3. The device of claim 1, wherein the interleaver parameter specifies interleaving of data across a plurality of OFDM tones.

4. The device of claim 1, further comprising storing the tone selection in the memory.

5. The device of claim 1, the modulation order comprising:
   1 for a binary phase-shift keying (BPSK) modulation;

2 for a quadrature phase-shift keying (QPSK) modulation;
4 for quadrature amplitude modulation (QAM) with 16 states (16-QAM);
6 for QAM with 64 states (64-QAM);
8 for QAM with 256 states (256-QAM); or
10 for QAM with 1024 states (1024-QAM).

6. The device of claim 1, the tone selection module being further configured to calculate a number of tones available for non-data use as $256-N_{SD}$.

7. The device of claim 6, wherein the non-data use comprises a pilot, a guard, or a direct component.

8. One or more non-transitory media storing instructions that, when executed by one or more processors, cause the one or more processors to perform acts comprising:
receiving one or more constraints for orthogonal frequency division multiplexing;
determining one or more valid tone configurations based on the one or more constraints; and
storing the valid tone configurations,
wherein the determining the one or more valid tone configurations comprises:
receiving a selection of a number of data subcarriers $N_{SD}$;
computing a number of coded bits per symbol $N_{CBPS}=N_{SD}*M$ where $N_{SD}$ comprises a number of data subcarriers to test and M comprises a modulation order;
computing a number of coded bits per single carrier $N_{BPSCS}=N_{CBPS}/N_{SD}$;
computing $N_{ROW}=y*N_{BPSCS}$, where y is an assigned interleaver parameter;
computing $INT_{DIM}=N_{ROW}*N_{COL}$ where $N_{ROW}$ is a number of rows in an interleaver and $N_{COL}$ is a number of columns in the interleaver;
computing $$Z = \frac{N_{CBPS}}{INT_{DIM}};$$

computing $M_1=Z-\lfloor Z \rfloor$; and
computing a number of data bits per symbol $N_{DBPS}=r*N_{CBPS}$, where r is a code rate;
computing $M_2=N_{DBPS}-\lfloor N_{DBPS} \rfloor$.

9. The one or more non-transitory media of claim 8, further comprising determining that a tone selection is valid when $M_1=0$ and $M_2=0$.

10. The one or more computer-readable media of claim 8, wherein the interleaver parameter specifies distribution of data across a plurality of OFDM tones.

11. The one or more non-transitory media of claim 8, the modulation order comprising:
1 for a binary phase-shift keying (BPSK) modulation;
2 for a quadrature phase-shift keying (QPSK) modulation;
4 for quadrature amplitude modulation (QAM) with 16 states (16-QAM);
6 for QAM with 64 states (64-QAM);
8 for QAM with 256 states (256-QAM); or
10 for QAM with 1024 states (1024-QAM).

12. The one or more non-transitory media of claim 8, the determining further comprising calculating a number of tones available for non-data payload as $256-N_{SD}$.

13. The one or more non-transitory media of claim 12, wherein the non-data payload comprises a pilot, a guard, or a direct component.

14. One or more non-transitory media storing instructions that, when executed by one or more processors, cause the one or more processors to perform acts comprising:
transferring data with orthogonal frequency division multiplexing (OFDM) using quadrature amplitude modulation (QAM), the QAM configured to use a pre-determined number of states, a specified code rate, and a specified number of data tones;
generating the predetermined number of states, the specified code rate, and the data tones initially at least in part by:
receiving a selection of a number of data subcarriers $N_{SD}$ to test;
computing a number of coded bits per symbol $N_{CBPS}=N_{SD}*M$ where M comprises a modulation order;
computing a number of coded bits per single carrier $N_{BPSCS}=N_{CBPS}/N_{SD}$;
computing $N_{ROW}=y*N_{BPSCS}$, where y is an assigned interleaver parameter;
computing $INT_{DIM}=N_{ROW}*N_{COL}$ where $N_{ROW}$ is a number of rows in an interleaver and $N_{COL}$ is a number of columns in the interleaver;
computing $$Z = \frac{N_{CBPS}}{INT_{DIM}};$$

computing $M_1=Z-\lfloor Z \rfloor$;
computing a number of data bits per symbol $N_{DBPS}=r*N_{CBPS}$, where r is a code rate;
computing $M_2=N_{DBPS}-\lfloor N_{DBPS} \rfloor$; and
determining that a tone selection is valid when $M_1=0$ and $M_2=0$.

* * * * *